(12) United States Patent
 Pance

(10) Patent No.: US 9,367,093 B2
(45) Date of Patent: *Jun. 14, 2016

(54) TRANSPARENT ELECTRONIC DEVICE

(71) Applicant: Apple Inc., Cupertino, CA (US)

(72) Inventor: Aleksandar Pance, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,723

(22) Filed: Nov. 17, 2014

(65) Prior Publication Data

US 2015/0070276 A1    Mar. 12, 2015

Related U.S. Application Data

(63) Continuation of application No. 12/683,415, filed on Jan. 6, 2010, now Pat. No. 8,890,771.

(51) Int. Cl.
*G09G 3/00* (2006.01)
*G06F 1/16* (2006.01)
*G09G 3/20* (2006.01)
*G06F 3/01* (2006.01)
*G06F 3/14* (2006.01)

(52) U.S. Cl.
CPC ............... *G06F 1/1647* (2013.01); *G06F 3/01* (2013.01); *G09G 3/003* (2013.01); *G09G 3/20* (2013.01); *G06F 3/1431* (2013.01); *G09G 2300/023* (2013.01); *G09G 2340/12* (2013.01)

(58) Field of Classification Search
CPC ............. G09G 3/36; G06F 3/048; G06F 3/04; G06F 3/0346
See application file for complete search history.

(56) References Cited

U.S. PATENT DOCUMENTS

| 6,760,003 | B1 | 7/2004 | Sase |
| 7,205,959 | B2 | 4/2007 | Henriksson |
| 7,619,585 | B2 | 11/2009 | Bell et al. |
| 7,724,208 | B1 | 5/2010 | Engel et al. |
| 2003/0184528 | A1 | 10/2003 | Kawasaki et al. |
| 2004/0150584 | A1 | 8/2004 | Chuman et al. |

(Continued)

FOREIGN PATENT DOCUMENTS

| CN | 101292217 | 10/2008 |
| EP | 2129084 | 12/2009 |

(Continued)

OTHER PUBLICATIONS

Kiyokawa et al., "An optical see-through display for mutual occlusion with a real-time stereovision system." Computers & Graphics, vol. 25 (2001), pp. 765-779.

(Continued)

*Primary Examiner* — Alexander Eisen
*Assistant Examiner* — Cory Almeida
(74) *Attorney, Agent, or Firm* — Joseph F. Guihan

(57) ABSTRACT

A method and system for displaying images on a transparent display of an electronic device. The display may include one or more display screens as well as a flexible circuit for connecting the display screens with internal circuitry of the electronic device. Furthermore, the display screens may allow for overlaying of images over real world viewable objects, as well as a visible window to be present on an otherwise opaque display screen. Additionally, the display may include active and passive display screens that may be utilized based on images to be displayed.

17 Claims, 12 Drawing Sheets

(56) References Cited

U.S. PATENT DOCUMENTS

| | | | |
|---|---|---|---|
| 2004/0263060 A1 | 12/2004 | Gilmour et al. | |
| 2005/0052341 A1 | 3/2005 | Henriksson | |
| 2005/0073471 A1 | 4/2005 | Selbrede | |
| 2007/0085759 A1 | 4/2007 | Lee et al. | |
| 2007/0252804 A1* | 11/2007 | Engel et al. | 345/98 |
| 2007/0291015 A1* | 12/2007 | Mori | 345/173 |
| 2008/0192013 A1 | 8/2008 | Barrus et al. | |
| 2009/0027306 A1 | 1/2009 | Kawabe | |
| 2009/0262074 A1* | 10/2009 | Nasiri et al. | 345/158 |
| 2010/0328223 A1* | 12/2010 | Mockarram-Dorri et al. | 345/173 |

FOREIGN PATENT DOCUMENTS

| | | |
|---|---|---|
| GB | 2344905 | 6/2000 |
| JP | 2002214566 | 7/2002 |
| JP | 2003296022 | 10/2003 |
| JP | 2007334827 | 12/2007 |
| JP | 2008197634 | 8/2008 |
| JP | 2009031448 | 2/2009 |
| JP | 2009103866 | 5/2009 |
| JP | 2009145855 | 7/2009 |
| KR | 1020090073901 | 7/2009 |
| WO | 0115132 | 3/2001 |
| WO | 2006112740 | 10/2006 |

OTHER PUBLICATIONS

Wigdor et al., "Lucid Touch: A See-Through Mobile Device," UIST'07, Oct. 7-10, 2007, Newport, Rhode Island. USA, 10 pgs.

Olwa; "Unencumbered 3D Interaction with See-through Displays." Proceedings, NordiCHI 2008, Oct. 20-22, 2008, pp. 527-530.

International Search Report for PCT Application No. PCT/US2011/020344 dated Apr. 19, 2011, 10 pgs.

* cited by examiner

TRANSPARENT ELECTRONIC DEVICE

This application is a continuation of patent application Ser. No. 12/683,415, filed Jan. 6, 2010 which is hereby incorporated by reference herein in its entirety. This application claims the benefit of and claims priority to U.S. patent application Ser. No. 12/683,415, filed Jan. 6, 2010.

BACKGROUND

The present disclosure relates generally to an electronic device with a transparent display.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices increasingly include display screens as part of the user interface of the device. As may be appreciated, display screens may be employed in a wide array of devices, including desktop computer systems, notebook computers, and handheld computing devices, as well as various consumer products, such as cellular phones and portable media players. As these devices have become more popular, there has been an increase in demand for the type and amount of functionality that displays in these devices supply. Thus, there is a need for displays that may provide increased functionality to a user.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to an electronic device that includes a display screen having a viewing area with a transparent portion enabling a user to view objects behind the electronic device by looking at the display screen. The electronic device may further include one or more electronic components, including a power source, processor, and circuitry for transmitting signals representative of image data to the display. In certain embodiments, the transparent portion may encompass the entire viewing area, or only a portion of the viewing area of the display.

The electronic device may also include a housing or enclosure that has an opaque frame which surrounds the display. The electronic components may be arranged behind the opaque frame, such that the electronic components are not visible by a user viewing the display. The electronic device may also or instead include a black mask disposed on a portion of the device, and the electronic components may be arranged behind the black mask. Thus, a user located on one side of the electronic device may see through the electronic device to view physical objects on the other side. In additional embodiments, the electronic device may include two or more of such display screens (each having respective viewing areas with transparent portions) arranged in an overlaid or back-to-back manner.

Furthermore, in additional embodiments, the electronic device may include two or more of such display screens whereby one display screen includes an opaque region, but also provides a movable transparent window. In another embodiment, the device may include one or more active and/or one or more passive display screens that may be utilized based on the resolution of an image to be displayed as well as the sensed rotation of the device.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The application is generally directed to a method and system for displaying images on an electronic device and, in some embodiments, on a transparent electronic device. In certain embodiments, the transparent portion may encompass the entire viewing area, or only a portion of the viewing area of a device. The electronic device may also include a housing or enclosure that has an opaque frame which surrounds the display and electronic components may be arranged behind the opaque frame on, for example, one or more flexible circuits, such that the electronic components are not visible by a user viewing the display. Electronic components may also or instead be arranged behind a black mask of the display.

In additional embodiments, the electronic device may include two or more of such display screens (each having respective viewing areas with transparent portions) arranged in an overlaid or back-to-back manner. Furthermore, in additional embodiments, the electronic device may include two or more of such display screens whereby one display screen is partially opaque, but displays a movable transparent window thereon. The moveable window may, in one embodiment, be moved based on user input in the form of touching of a touch screen.

In another embodiment, the device may include one or more active and/or one or more passive display screens. These screens may be utilized based on a comparison of the resolution of an image to be displayed with a threshold level. Furthermore, the utilization of the display screens may be based on sensed rotation of the device.

Figure 1:
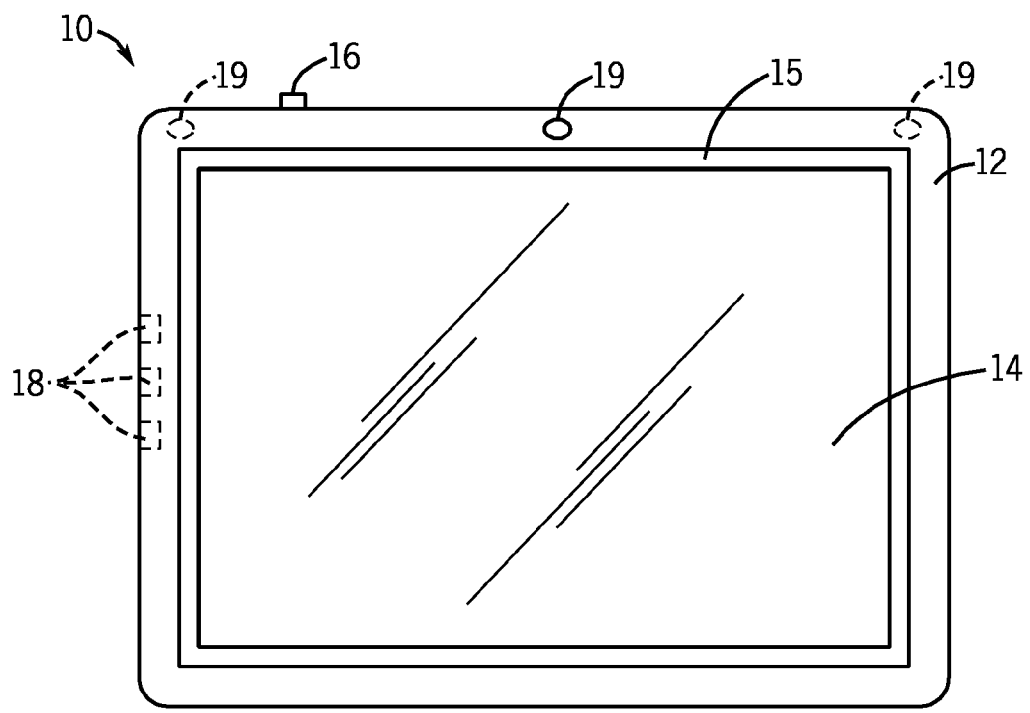
FIG. 1 is a perspective view illustrating an electronic device, in accordance with one embodiment of the present invention.

An electronic device 10 is illustrated in FIG. 1 in accordance with one embodiment of the present invention. In some embodiments, including the presently illustrated embodiment, the device 10 may be a portable electronic device, such as a tablet computer. Other electronic devices may also include a viewable media player, a cellular phone, a personal data organizer, another computer, or the like. Indeed, in such embodiments, a portable electronic device may include a combination of the functionalities of such devices. In addition, the electronic device 10 may allow a user to connect to and communicate through the Internet or through other networks, such as local or wide area networks. For example, the portable electronic device 10 may allow a user to access the Internet and to communicate using e-mail, text messaging, or other forms of electronic communication. By way of example, the electronic device 10 may be a model of a MacBook®, MacBook® Pro, MacBook Air®, iMac®, Mac Pro®, iPhone®, or iPod® available from Apple Inc. of Cupertino, Calif. In other embodiments, the electronic device 10 may include other models and/or types of electronic devices employing a display, available from any manufacturer. Further, the electronic device 10 may include handheld devices (e.g., tablet computers and portable media players), other portable devices (e.g., notebook computers), or generally stationary devices (e.g., desktop computers and monitors).

In certain embodiments, the electronic device 10 may be powered by one or more rechargeable and/or replaceable batteries. Such embodiments may be highly portable, allowing a user to carry the electronic device 10 while traveling, working, and so forth. While certain embodiments of the present invention are described with respect to a portable electronic device, it should be noted that the presently disclosed techniques may be applicable to a wide array of other electronic devices and systems that are configured to render graphical data, such as a desktop computer.

In the presently illustrated embodiment, the electronic device 10 includes an enclosure or housing 12, a display 14, input structures 16, and input/output (I/O) ports or connectors 18. The enclosure 12 may be formed from plastic, metal, composite materials, or other suitable materials, or any combination thereof. The enclosure 12 may be, for example, a handheld housing for a handheld device. The enclosure 12 may protect the interior components of the electronic device 10, such as processors, circuitry, and controllers, among others, from physical damage, and may also shield the interior components from electromagnetic interference (EMI). In one embodiment, the enclosure 12 may include one or more bezels that may support multiple display screens. The enclosure 12 may be formed in such a way as to provide a support structure for the remaining elements illustrated in FIG. 1. Additionally, some or all of the enclosure may be made of transparent or translucent material to allow a user to see through the electronic device 10.

As noted above, the device may include a display 14. The display 14 may be a liquid crystal display (LCD), which may be a light emitting diode (LED) based display or some other suitable display. For example, the LCD may be an organic light emitting diode display (OLED display). Furthermore, as will be further discussed below, the display 14 may include multiple display screens positioned in an overlaid manner such that images displayed on each of the display screens may be concurrently visible on the display 14. In other embodiments, however, the display 14 may include a single display screen. Additionally, the display 14 may be a touch screen display that allows a user to navigate a displayed user interface, such as a graphical user interface (GUI), and/or other applications running on the electronic device 10 through, for example, contact with the display 14. For example, a user may make selections and move a cursor by simply touching the display 14 via a finger or stylus, which may be interpreted by the device 10 to perform an action based on the touch event.

The display 14 may be used to display one or more images, for example, through the use of a liquid crystal substance typically disposed between two substrates (in the case of an LCD) or organic layers that operate to emit light (in the case of an OLED display). Furthermore, it should be noted that the display 14 may be transparent. That is, light may pass through the display 14 such that actual images behind the electronic device 10 may be seen through the display 14. In one embodiment, actual objects may be seen through the display 14 and graphical overlays may be viewed on the display 14. In other words, both real-world objects and graphical images rendered by electronic device 10 may be visible on the display 14 simultaneously. In one embodiment, the entire surface area of the display 14 may be transparent, allowing a user to view real-world objects through the display 14. In another embodiment, one or more portions of the display 14 may be transparent, while the remainder of the display 14 may be opaque. In another embodiment, the electronic device 10 may be virtually transparent. That is, the electronic device 10 may include one or more cameras 19 for capturing an image behind the electronic device 10 as well as internal components that may be utilized to generate a graphical representation of the image behind the electronic device 10 on the display 14.

As noted above, the electronic device 10 may also include input structures 16. In one embodiment, one or more of the input structures 16 are configured to control the device 10, such as by controlling a mode of operation, an output level, an output type, etc. For instance, the input structures 16 may include a button to turn the device 10 on or off. Further the input structures 16 may allow a user increase or decrease the brightness of the display 14. Embodiments of the portable electronic device 10 may include any number of input structures 16, including buttons, switches, rocker arms, or any other suitable input structures that may be used to interact with electronic device 10. These input structures 16 may operate to control functions of the electronic device 10 and/or any interfaces or devices connected to or used by the electronic device 10.

The device 10 may also include various I/O ports 18 to allow connection of additional devices. For example, the device 10 may include any number of input and/or output ports 18, such as headphone and headset jacks, universal serial bus (USB) ports, IEEE-1394 ports, Ethernet and modem ports, and AC and/or DC power connectors. Further, the electronic device 10 may use the I/O ports 18 to connect to and send or receive data with any other device, such as a modem, networked computers, printers, displays, or the like. For example, in one embodiment, the electronic device 10 may connect to an iPod® via a USB connection to send and receive data files, such as media files.

Figure 2:
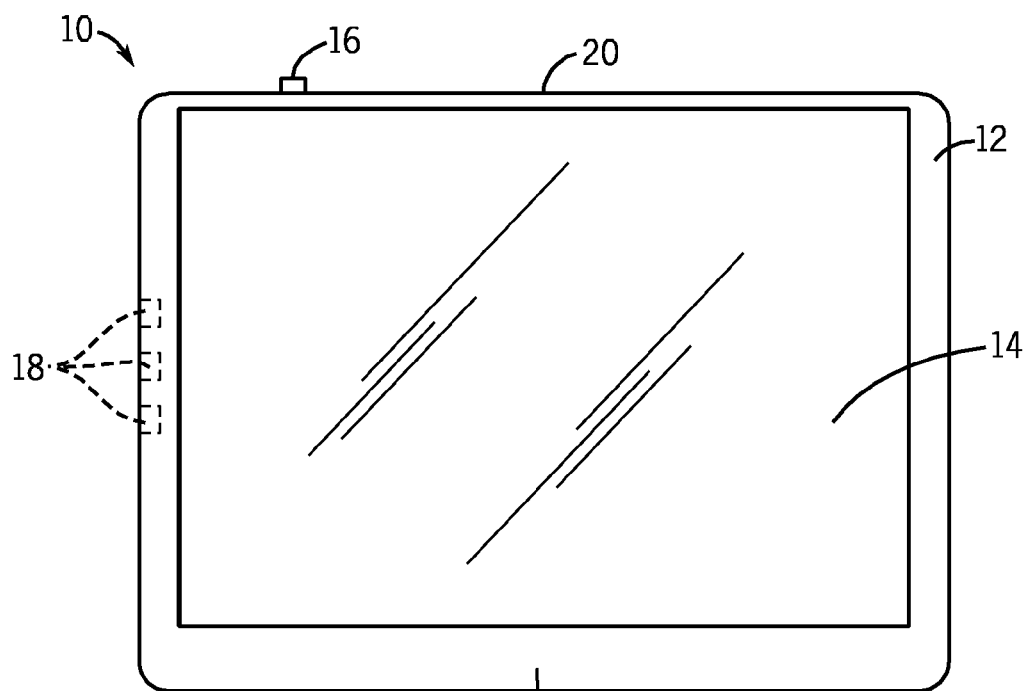
FIG. 2 is a perspective view illustrating an alternative configuration of the electronic device of FIG. 1, in accordance with one embodiment of the present invention.

As illustrated in FIG. 1, the display 14 in the electronic device 10 may be centrally aligned. That is, the display 14 may be positioned such that the enclosure 12 surrounds the display 14 equally on all sides. Alternatively, the display 14 may be offset with respect to the enclosure 12. FIG. 2 illustrates an embodiment of the electronic device whereby the display 14 is more closely aligned with the top portion 20 of the enclosure 12 than the bottom portion 22 of the enclosure 12. This may allow for a bottom portion 22 of the enclosure 12 that is at least approximately two, four, six, eight, ten times or more as wide as the top portion 20. The extra width may allow for a larger contiguous area in which internal components of the device 10 (such as batteries) may be located without impacting the size and transparency of the display 14.

Figure 3:
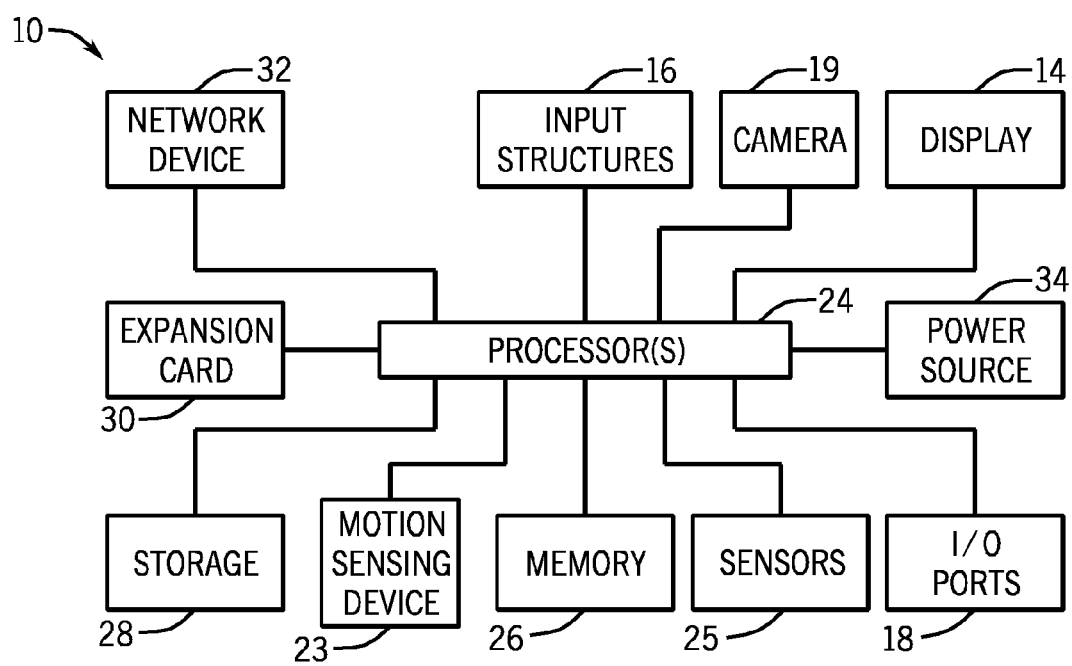
FIG. 3 is a simplified block diagram illustrating components of the electronic device of FIG. 1, in accordance with one embodiment of the present invention.

The internal components of electronic device 10 may be used to provide various functionalities for the electronic device 10. FIG. 3 illustrates a block diagram illustrating various components that may be utilized in conjunction with the electronic device 10. Those of ordinary skill in the art will appreciate that the various functional blocks shown in FIG. 3 may include hardware elements (including circuitry), software elements (including computer code stored on a machine-readable medium) or a combination of both hardware and software elements. It should further be noted that FIG. 3 is merely one example of a particular implementation, other examples could include components used in Apple Inc. products such as an iPod®, MacBook®, MacBook® Pro, MacBook Air®, iMac®, or Mac Pro®, iPhone®, or another electronic device 10 utilizing a display 14.

In the presently illustrated embodiment of the electronic device 10, the components may include the display 14, input structures 16, I/O ports 18, one or more cameras 19, a motion sensing device 23, one or more processors 24, sensor(s) 25, a memory device 26, non-volatile storage 28, expansion card(s) 30, a networking device 32, and a power source 34. With regard to each of these components, it is first noted that the display 14 may be used to display various images generated by the device 10 and may be provided in conjunction with a touch-sensitive element, such as a touch screen, that may be used as part of the control interface for the device 10.

Thus, user interaction with the display 14, such as to interact with a user or application interface displayed on the display 14, may generate electrical signals indicative of user input. These input signals may be routed via suitable pathways, such as an input hub or bus, to the processor(s) 24 for further processing. That is, the display 14 may operate as a touch screen, in which a touch sensitive mechanism is provided in conjunction with the display 14. In such embodiments, the user may select or interact with displayed interface elements via the touch sensitive mechanism. In this way, the displayed interface may provide interactive functionality, allowing a user to navigate the displayed interface by touching the display 14.

The electronic device may also include input structures 16, which may include the various devices, circuitry, and pathways by which user input or feedback is provided to the processor(s) 24. Such input structures 16 may be configured to control a function of the electronic device 10, applications running on the device 10, and/or any interfaces or devices connected to or used by the device 10. For example, the input structures 16 may allow a user to activate or deactivate the electronic device 10 and/or adjust the brightness of the display 14. Non-limiting examples of the input structures 16 include buttons, sliders, switches, control pads, keys, knobs, scroll wheels, keyboards, mice, touchpads, and so forth.

As noted above, the I/O ports 18 may include ports configured to connect to a variety of external devices, such as a power source, headset or headphones, or other electronic devices (such as handheld devices and/or computers, printers, projectors, external displays, modems, docking stations, and so forth). The I/O ports 18 may support any interface type, such as a universal serial bus (USB) port, a video port, a serial connection port, an IEEE-1394 port, an Ethernet or modem port, and/or an AC/DC power connection port.

The electronic device 10 may include one or more cameras 19. In one embodiment, the electronic device may include a front facing camera 19. This front facing camera 19 may be utilized to facilitate a video conferencing, video calls, or other applications in which it may be beneficial to capture images of the user. Additionally and/or alternatively, the electronic device 10 may include one or more rear facing cameras 19. The rear facing cameras 19 may be utilized to capture images for viewing on the display 14. In one embodiment, through the use of two rear facing cameras 19, images of a viewable real-world object may be captured and rendered on the display 14 in a three dimensional manner.

Motion sensing device 23 may be any device configured to measure motion or acceleration experienced by device 10, such as an accelerometer or a gyroscope. In one embodiment, motion sensing device 23 may be a three-axis accelerometer that includes a sensing element and an integrated circuit interface for providing the measured acceleration and/or motion data to processor(s) 24. Motion sensing device 23 may be configured to sense and measure various types of motion including, but not limited to, velocity, acceleration, rotation, and direction, any or all of which may be used as a basis for altering the manner in which the display 14 outputs images. Additionally, in other embodiments, the electronic device 10 may include various sensors such as proximity sensors, ambient light sensors, capacitive touch sensors, infrared sensors, ultrasonic sensors, and/or other sensors that may facilitate operation of the device 10, interaction between the device 10 and a user, or the like.

The processor(s) 24 may provide the processing capability to execute the operating system, programs, user and application interfaces, and any other functions of the electronic device 10. The processor(s) 24 may include one or more microprocessors, such as one or more "general-purpose" microprocessors, one or more special-purpose microprocessors and/or application specific integrated circuits (ASICS), or some combination of such processing components. For example, the processor(s) 24 may include one or more reduced instruction set (RISC) processors, as well as graphics processors, video processors, audio processors, and the like. As will be appreciated, the processor(s) 24 may be communicatively coupled to one or more data buses or chipsets for transferring data and instructions between various components of the electronic device 10.

Programs or instructions executed by the processor(s) 24 may be stored in any suitable manufacture that includes one or more tangible, computer-readable media at least collectively storing the executed instructions or routines, such as, but not limited to, the memory devices and storage devices described below. Also, these programs (e.g., an operating system) encoded on such a computer program product may also include instructions that may be executed by the processor(s) 24 to enable the device 10 to provide various functionalities, including those described herein.

The instructions or data to be processed by the processor(s) 24 may be stored in a computer-readable medium, such as memory 26. The memory 26 may include a volatile memory, such as random access memory (RAM), and/or a non-volatile memory, such as read-only memory (ROM). The memory 26 may store a variety of information and may be used for various purposes. For example, the memory 26 may store firmware for the electronic device 10 (such as basic input/output system (BIOS)), an operating system, and various other programs, applications, or routines that may be executed on the electronic device 10. In addition, the memory 26 may be used for buffering or caching during operation of the electronic device 10.

The components of device 10 may further include other forms of computer-readable media, such as non-volatile storage 28 for persistent storage of data and/or instructions. The non-volatile storage 28 may include, for example, flash memory, a hard drive, or any other optical, magnetic, and/or solid-state storage media. The non-volatile storage 28 may also be used to store firmware, data files, software programs, wireless connection information, and any other suitable data.

The embodiment illustrated in FIG. 3 may also include one or more card or expansion slots. The card slots may be configured to receive one or more expansion cards 30 that may be used to add functionality, such as additional memory, I/O functionality, or networking capability, to electronic device 10. Such expansion cards 30 may connect to device 10 through any type of suitable connector, and may be accessed internally or external to the housing of electronic device 10. For example, in one embodiment, the expansion cards 30 may include a flash memory card, such as a SecureDigital (SD) card, mini- or microSD, CompactFlash card, Multimedia card (MMC), or the like. Additionally, the expansion cards 30 may include one or more processor(s) 24 of the device 10, such as a video graphics card having a GPU for facilitating graphical rendering by device 10.

The components depicted in FIG. 3 also include a network device 32, such as a network controller or a network interface card (NIC), internal to the device 10. In one embodiment, the network device 32 may be a wireless NIC providing wireless connectivity over any 802.11 standard or any other suitable wireless networking standard. The network device 32 may allow electronic device 10 to communicate over a network, such as a personal area network (PAN), a local area network (LAN), a wide area network (WAN), or the Internet. Further, electronic device 10 may connect to and send or receive data with any device on the network, such as portable electronic devices, personal computers, printers, and so forth via the network device 32. Alternatively, in some embodiments, electronic device 10 may not include an internal network device 32. In such an embodiment, an NIC may be added as an expansion card 30 to provide similar networking capability as described above.

Further, the device 10 may also include a power source 34. In one embodiment, the power source 34 may be one or more batteries, such as a lithium-ion polymer battery or other type of suitable battery. The battery may be user-removable or may be secured within the housing of the electronic device 10, and may be rechargeable. Additionally, the power source 34 may include AC power, such as provided by an electrical outlet, and the electronic device 10 may be connected to the power source 34 via a power adapter. This power adapter may also be used to recharge one or more batteries of the device 10. In another embodiment, the power source 34 may include an inductively or wirelessly charged power source.

In one embodiment, the processor(s) 24, memory 26, storage 28, network device 32, and/or the power source 34 may, for example, be physically located around the display 14 and/or inside of the enclosure 12. For example, the power source 34 may include batteries coupled in parallel and stored in the bottom portion 22 of the electronic device 10. Alternatively, the power source 34 may include batteries connected in parallel and sized to surround the display 14 in the enclosure. Furthermore, it is envisioned that components of the device 10, such as the processor(s) 24, memory 26, storage 28, and/or network device 32 may be mounted via one or more flexible circuits (or flex boards) for surrounding the display 14.

Figure 4:
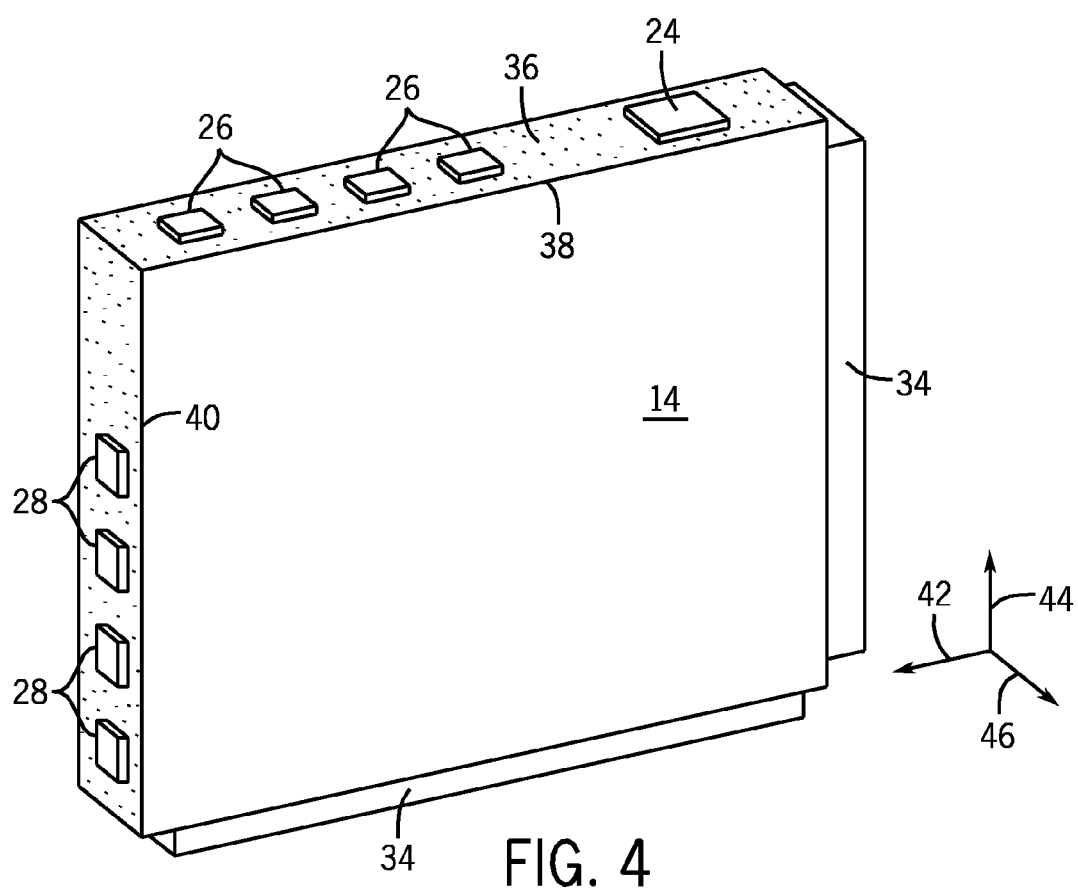
FIG. 4 is a perspective view illustrating the display and other components of the electronic device of FIG. 1, in accordance with one embodiment of the present invention.

FIG. 4 illustrates a perspective view of the display 14 that includes a flexible circuit 36 thereon. The flexible circuit 36 may be mounted directly onto the display 14. The flexible circuit 36 may include a plastic substrate, such as a polyimide material, that is malleable, allowing for the flexible circuit 36 to be positioned on one or more edges 38 and 40 of the display 14. As illustrated, the flexible circuit 36 may be positioned along both the top edge 38 and the side edge 40 of the display 14. Moreover, each of the processor(s) 24, memory 26, and storage 28 may be positioned on the flexible circuit 36. The processor(s) 24, memory 26, and storage 28 may be electrically coupled via the flexible circuit 36 and, furthermore, the processor(s) 24 may be, for example, also electrically coupled to the display 14. Additionally, the power source 34 (in the form of parallel connected batteries) may by electrically and physically coupled to the flexible circuit 36 (as well as to the illustrated processor(s) 24, memory 26, and storage 28), as illustrated in FIG. 4. In this manner, the internal components of the electronic device 10 may be provided around the display 14 so as to minimize overall surface area utilized by the device 10. It should also be noted that the flexible circuit may alternatively or additionally be physically coupled to the enclosure 12, while electrically coupled to the display 14.

In another embodiment, the flexible circuit 36 may be sequentially stacked. For example, the flexible circuit 36 may be of a uniform size in the x-direction 42 as well as in the y-direction 44. Moreover, in one embodiment, multiple flexible circuits 36 may be utilized when multiple display screens are overlaid in the z-direction 46. This may be accomplished by affixing a single (or multiple) flexible circuits 36 to each of a group of overlaid display screens in the display 14. Thus, in one embodiment, each of the flexible circuits 36 affixed to a given display screen may be of an equal width of the display screen to which the flexible circuit 36 is affixed. Additionally, a single flexible circuit 36 may be affixed to the multiple display screens such that the single flexible circuit 36 may be approximately equivalent to the combined width of the multiple display screens. Furthermore, each of these display screens may be enclosed by the enclosure 12, for example, by a bezel that encloses each of the multiple display screens, with, for example, a flange that covers the outer exposed faces of the display screens. Techniques utilizing multiple display screens in conjunction with the electronic device 10 are discussed below. Although some of the following examples include two display screens within the electronic device 10, it is noted that other embodiments may include only a single display screen or may include more than two display screens.

Figure 5:
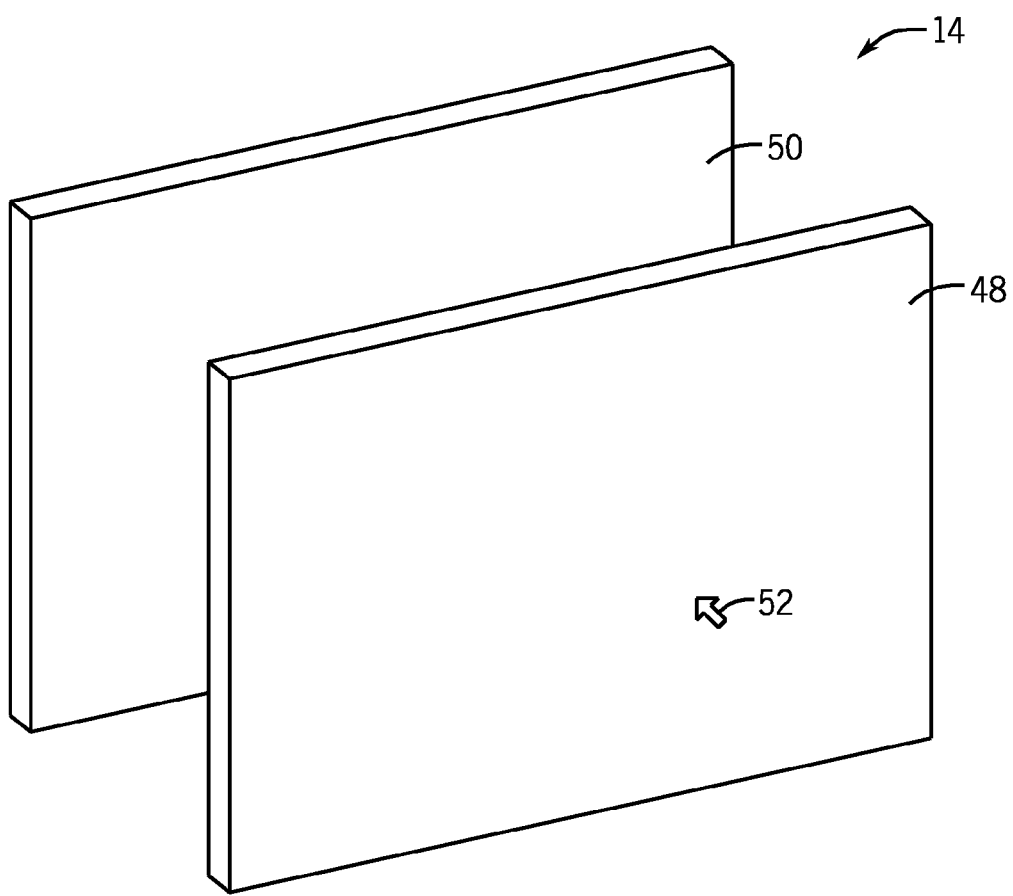
FIG. 5 is a second perspective view illustrating the display of the electronic device of FIG. 1, in accordance with one embodiment of the present invention.

FIG. 5 illustrates a display 14 that includes two display screens 48 and 50. It should be noted that FIG. 5 (as well as some subsequent figures) shows an exploded perspective view of the display 14 without the enclosure 12, or other elements of the electronic device 10, for the sake of explanation. Furthermore, the display screens 48 and 50 may contact one another in the device 10 or may be spaced apart at one or more various distances. In one embodiment, each of the display screens 48 and 50 may both be OLED type display screens. In other embodiments, one display screen 48 may be, for example, an LCD type display screen while the other display screen 50 may be, for example, an OLED type display screen. However, regardless of the type of screen which display screens 48 and 50 include, both display screen 48 and display screen 50 may be transparent in one embodiment.

Furthermore, each of display screens 48 and 50 may be sized such that the display screens 48 and 50 overlap one another. It is envisioned that each of the display screens 48 and 50 may receive signals from the processor(s) 24 for generation of at least one image thereon. Moreover, it is envisioned that each of the display screens 48 and 50 may generate differing images simultaneously. In one embodiment, each of the display screens 48 and 50 may generate images that when viewed together by a user, will appear to generate a three dimensional image on the display.

Additionally, each of the display screens 48 and 50 may generate images that may be viewed together by a user, such that the images will appear to be overlaid. That is, an image generated on display screen 48, for example, may appear to the user to be in front of an image generated on the display screen 50. For example, a cursor or other interface indicator 52 may be generated on display screen 48 while a series of images in the form of a video is generated on display screen 50. In this manner, a user may be able to view an interface indicator 52 while simultaneously viewing a video. In one embodiment, an image may be generated by the processor(s) 24 for display on display screen 48 and display screen 50 such that the processor(s) 24 may generate the image for display on display screen 48 while simultaneously generating an inverse of the image for display on the display screen 50. In this manner, user on opposite sides of the electronic device 10 may view an image in the same orientation.

Moreover, by utilizing a touch screen in conjunction with the display screens 48 and 50, a user may be able to interface with the electronic device 10 by touching portions of the display 14, which may correspondingly move the location of the interface indicator 52 generated on display screen 48. Indeed, the generation of this indicator 52 on a display screen 48 may be useful for interfacing with the electronic device 10 in other manners as well. Other overlays in addition to or instead of the interface indicator 52 may be generated on the display screen 48. For example, overlays that include icons, text, graphics, or other generated images may be generated on the display screen 48.

These overlays whether in handheld or other electronic devices 10, may provide an "augmented reality" interface in which the overlays virtually interact with real-world objects. For example, the overlays may be transmitted onto a display screen that overlays a museum exhibit, such as a painting. The overlay may include information relating to the painting that may be useful or interesting to viewers of the exhibit. Additionally, overlays may be utilized on displays in front of, for example, landmarks, historic sites, or other scenic locations. The overlays may again provide information relating to real-world objects as they are being viewed by a user. These overlays may additionally be utilized on, for example, vehicles utilized by tourists. For example, a tour bus may include one or more displays as windows for users. These displays may present overlays that impart information about locations viewable from the bus. Various additional augmented reality applications that may be provided via electronic device 10 are disclosed in U.S. application Ser. No. 12/652,725, filed Jan. 5, 2010, and entitled "SYNCHRONIZED, INTERACTIVE AUGMENTED REALITY DISPLAYS FOR MULTIFUNCTION DEVICES," which is hereby incorporated by reference.

Figure 6:
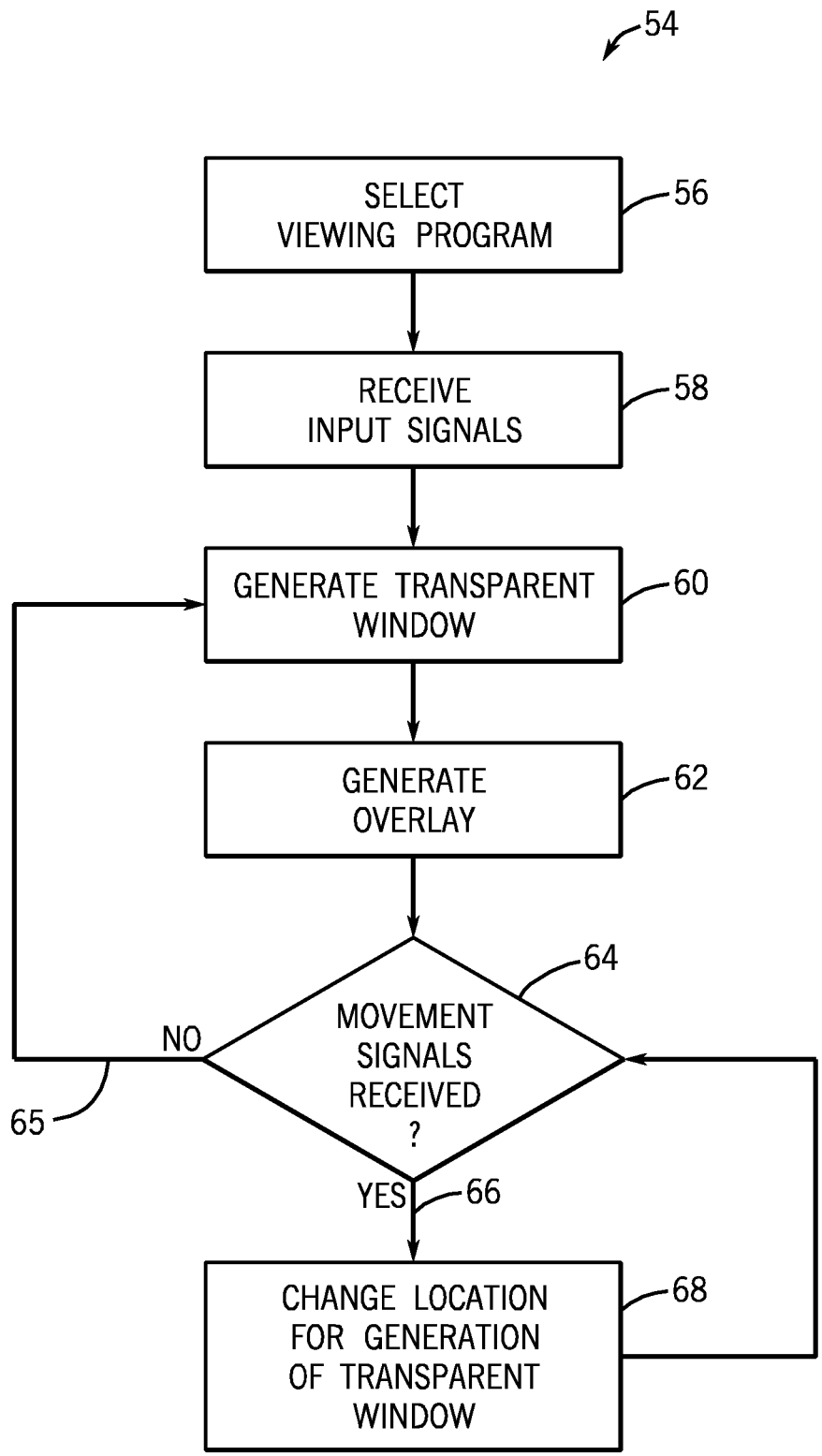
FIG. 6 is a flow diagram illustrating the operation of the display of FIG. 1, in accordance with one embodiment of the present invention.
Figure 7:
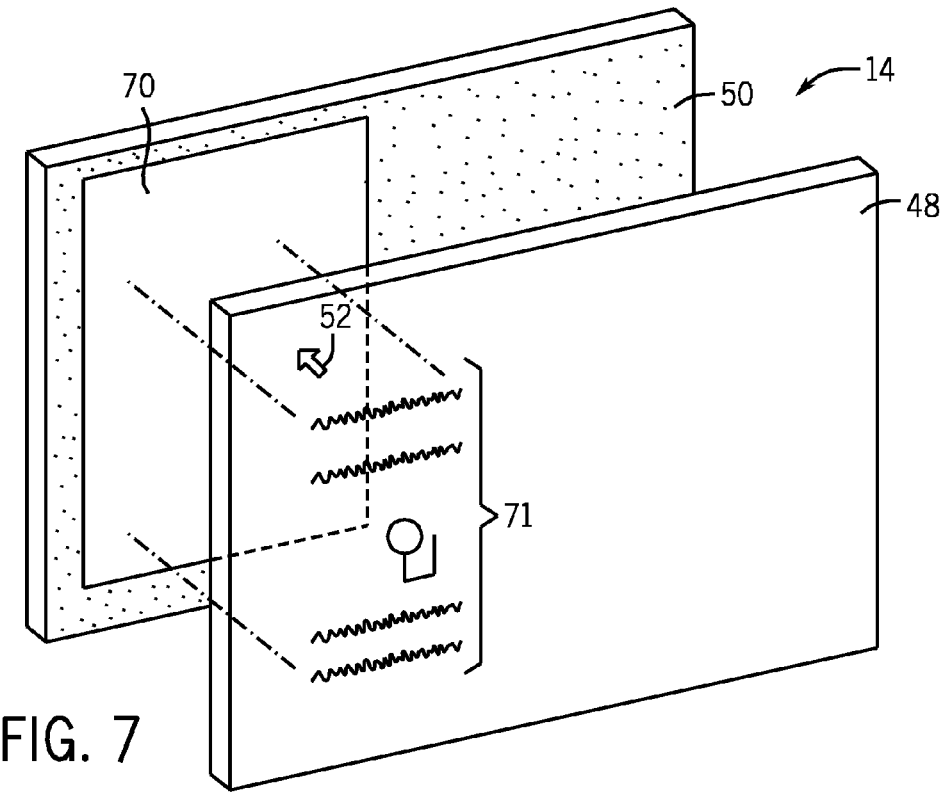
FIG. 7 is a third perspective view illustrating the display of the electronic device of FIG. 1, in accordance with one embodiment of the present invention.
Figure 8:
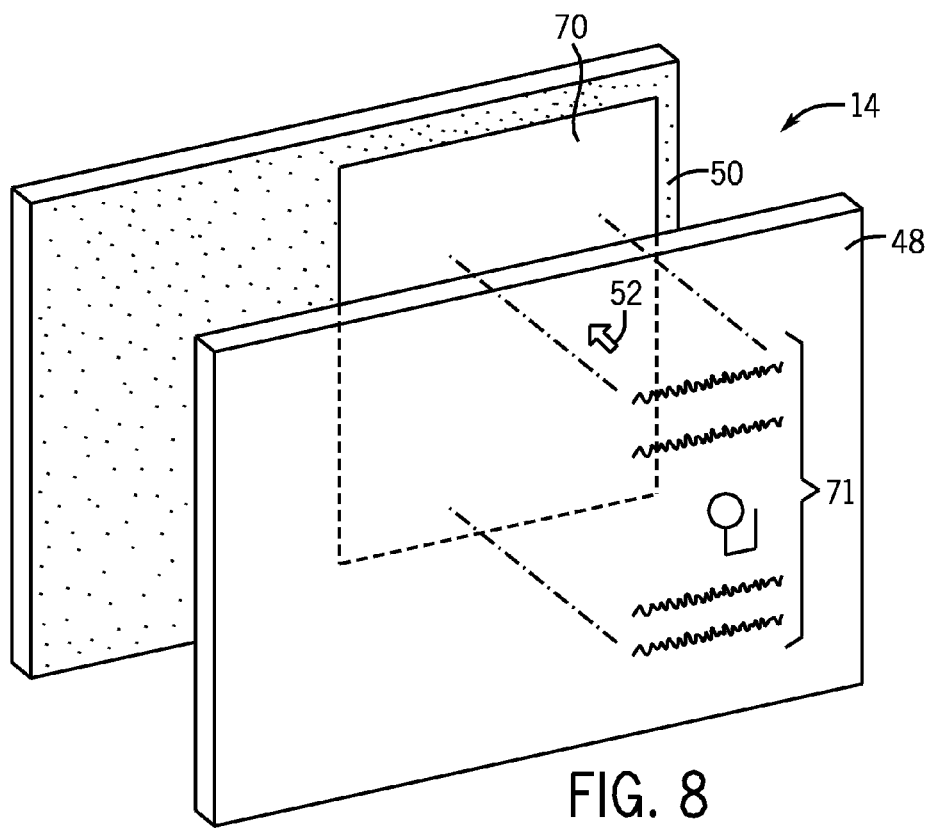
FIG. 8 is a fourth perspective view illustrating the display of the electronic device of FIG. 1, in accordance with one embodiment of the present invention.

FIGS. 6-8, illustrate a technique for utilization of multiple display screens 48 and 50 in conjunction with an embodiment. FIG. 6 illustrates a flow chart 54 detailing a viewing program or routine that allows a user to view both images and real world events simultaneously via the display 14 in conjunction with one embodiment. As shown in step 56 of flow chart 54, a viewing program or routine may be selected. This program may be an executable program stored in, for example, memory 26 and accessible by processor(s) 24. The viewing program may allow for a portion of the display 14, such as display screen 50, to be selectively transparent while the remainder of the area of the display screen 50 is opaque, as generally depicted in FIG. 7. For example, display screen 50 may include an in-plane switching LCD screen in which pixels of the screen default to an "off" state that inhibits light transmission through the screen 50. This may be accomplished by driving a voltage to zero (i.e., providing no voltage) to the pixels in an "off" state (i.e., the pixels in an opaque region). Furthermore, voltage could then be applied to pixels of the display screen 50 to enable light transmission through such pixels (when desired), allowing a user to view real-world objects through the activated pixels of display screen 50, thus generating a window in the opaque region.

In other embodiments, the display screen 50 may include an LCD having pixels that default to an "on" state allowing light transmission and which can be activated to render some or all of the pixels opaque. In still another embodiment, each of display screens 48 and 50 may include an OLED display. In this embodiment, the display screen 50 may selectively deactivate pixels to form a window 70 (FIG. 7), and display screen 48 may output information over any image generated by the display screen 50, over any real-world object viewable by a user through the window 70, or both. Moreover, display screen 48 may be generally transparent, and may be used to overlay the interface indicator 52 or other graphical elements (e.g., text or icons) over the output of display screen 50.

In step 58, a user may move the interface indicator 52 over a desired region of overlaid display screens 48 and 50 by, for example, dragging a finger across the display 14 to a desired area. This movement will be registered as one or more input signals in step 58 such that the processor(s) 24 may cause the interface indicator 52 to update the location of the interface indicator 52 to a new location on imaging display 48 corresponding to the position of the touch by the user. Additionally, an input, such as a tap or a double tap of the display in a desired area may be received by the processor(s) 24.

This tap or double tap input by a user may cause the processor(s) 24 to change the voltage driven to an area of the display screen 50 corresponding to the location of the tap or double tap by the user such that the pixels in the area are driven to voltages that cause the area to be transparent. This generation of a transparent area, or window 70, is illustrated in step 60 of FIG. 6. As may be seen in FIG. 7, the window 70 may occupy a location on display screen 50 that corresponds to the location of the interface indicator 52. The size of the window may be fixed or, alternatively, the size of the window may be adjustable by the user.

In step 62, an overlay, such as illustrated in FIGS. 7-8 may be generated by the processor(s) 24. This overlay 71 may be generated on display 48 and may be overlaid over the location of window 70 on display screen 50. The overlay 71 may include, for example, images, text, and/or other graphic elements. Furthermore, generation of this overlay, when accomplished simultaneously with generation of the window 70, may allow a user to view real-world objects through display screens 48 and 50 with informational overlays over the real-world objects. The overlay 71 may also or instead be provided over other portions of the display screen 50.

In step 64, the processor(s) 24 may determine if any further movement input signals have been received regarding the window 70. That is, in step 64, the processor may determine if the area above the interface indicator 52 has been touched by a user. If the area has not been touched, in step 65, the processor(s) 24 may continue to generate the window 70 at the current location on display screen 50. If, however, the processor(s) 24 have detected input movement across display screen 48 in step 66, then the processor(s) 24 may change the location for generation of the transparent window 70 in step 68.

That is, when a user is determined to have touched a region on the display 14 corresponding to the window 70 location on display screen 50, the processor may change the location of where the window 70 is generated on the display screen 50 to a location corresponding to the final location of the display 14 touched by the user. For example, in FIG. 8, if a user moves the interface indicator 52 in the x-direction 42 with respect to FIG. 7, then the processor(s) 24 may operate to generate the window 70 at the location corresponding to the final location of the display 14 touched by the user. In other embodiments, similar functionality with respect to movement of the window 70 may be accomplished without using an interface indicator, for example, directly through touch by a user. Subsequent to this movement of the window 70, the process may return to step 62, as illustrated in FIG. 6. In this manner, a user may be able to generate a window of transparency in the display, while allowing for the remainder of the display 14 to remain opaque.

Figure 9:
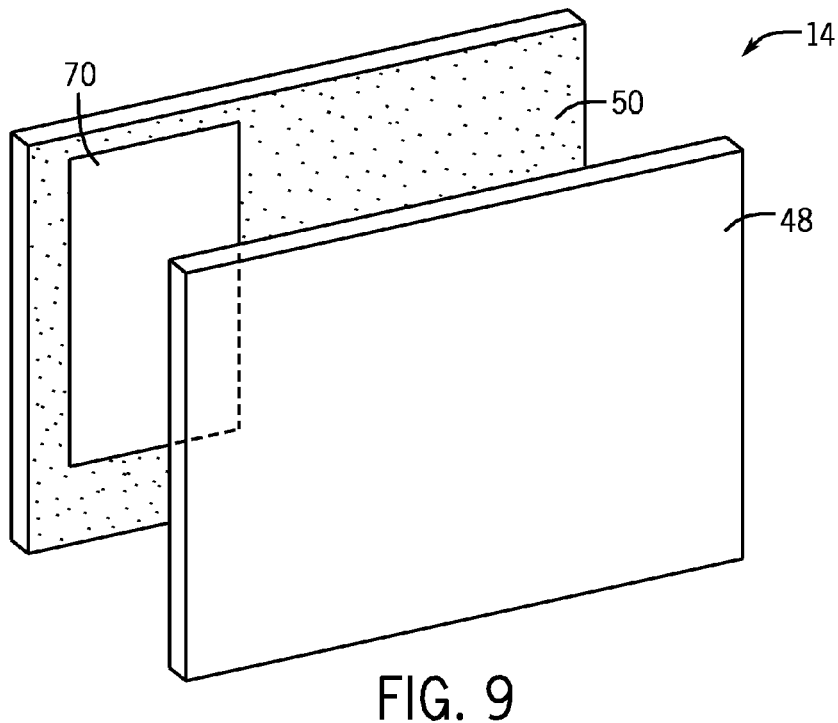
FIG. 9 is a fifth perspective view illustrating the display of the electronic device of FIG. 1, in accordance with one embodiment of the present invention.
Figure 10:
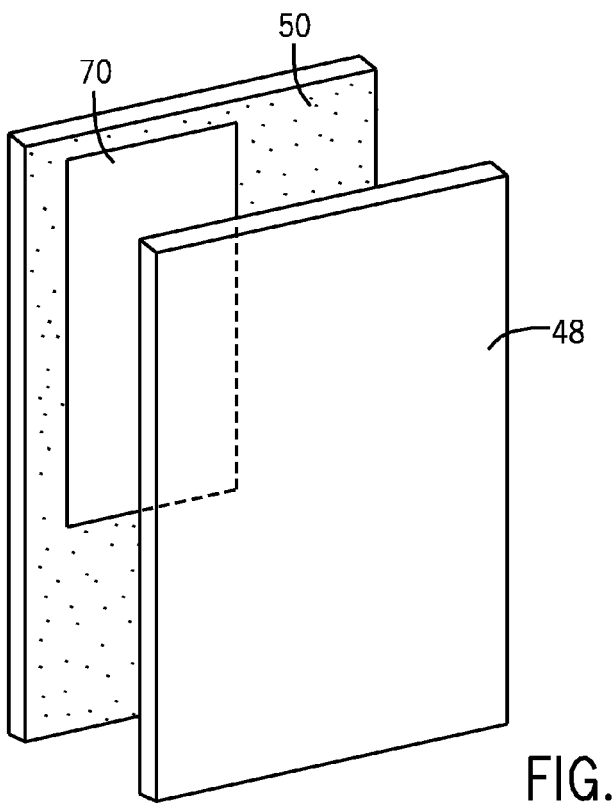
FIG. 10 is a sixth perspective view illustrating the display of the electronic device of FIG. 1, in accordance with one embodiment of the present invention.

Moreover, it is envisioned that a motion sensing device 23 may be utilized in the device 10 to allow for a window 70 to be viewable at a specific location with respect to the user regardless of the orientation of the electronic device 10. For example, FIG. 9 illustrates the window 70 as present on display screen 50, similar to the display window 70 of FIG. 7. However, if a user rotates the electronic device 10 ninety degrees from the illustrated placement in FIG. 9, the display screens 48 and 50 may be oriented as illustrated in FIG. 10. As this rotation occurs, the motion sensing device 23 may operate to transmit data to the processor(s) 24 indicating the amount of rotation that has occurred. This data may allow for the processor(s) 24 to change the location of the window 70. Accordingly, the processor(s) may cause the window 70 to be repositioned as illustrated in FIG. 10.

Figure 11:
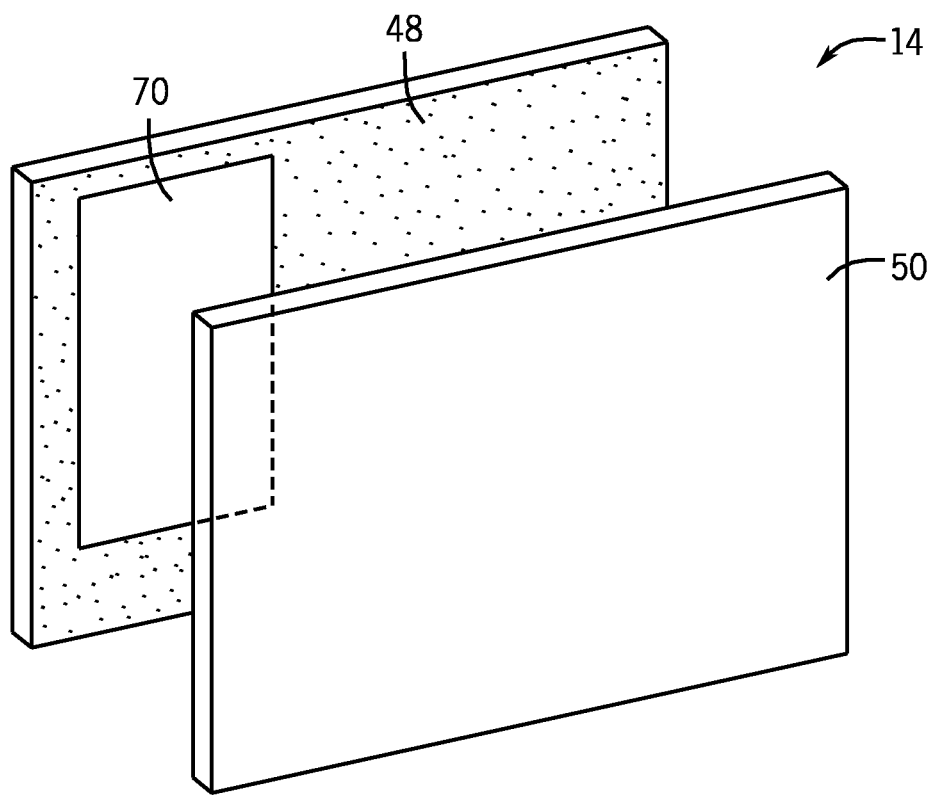
FIG. 11 is a seventh perspective view illustrating the display of the electronic device of FIG. 1, in accordance with one embodiment of the present invention.

In another embodiment, a user may rotate the device 10 one hundred and eighty degrees relative to the illustrated device 10 in FIG. 9, such that display screen 50 is facing the user and the display screen 48 is away from the user, as illustrated in FIG. 11. In this embodiment, the motion sensing device 23 may transmit data to the processors(s) 24 indicating the amount of rotation that has occurred. The processor(s) may utilize this data to change the location of the window 70 from being generated on display screen 50 to display screen 48, as illustrated in FIG. 11. Furthermore, the operation of the motion sensing device 23 described above may provide movement signals to the processor(s) 24 (block 64), which may be processed to alter the position of the window 70 as discussed above.

Figure 12:
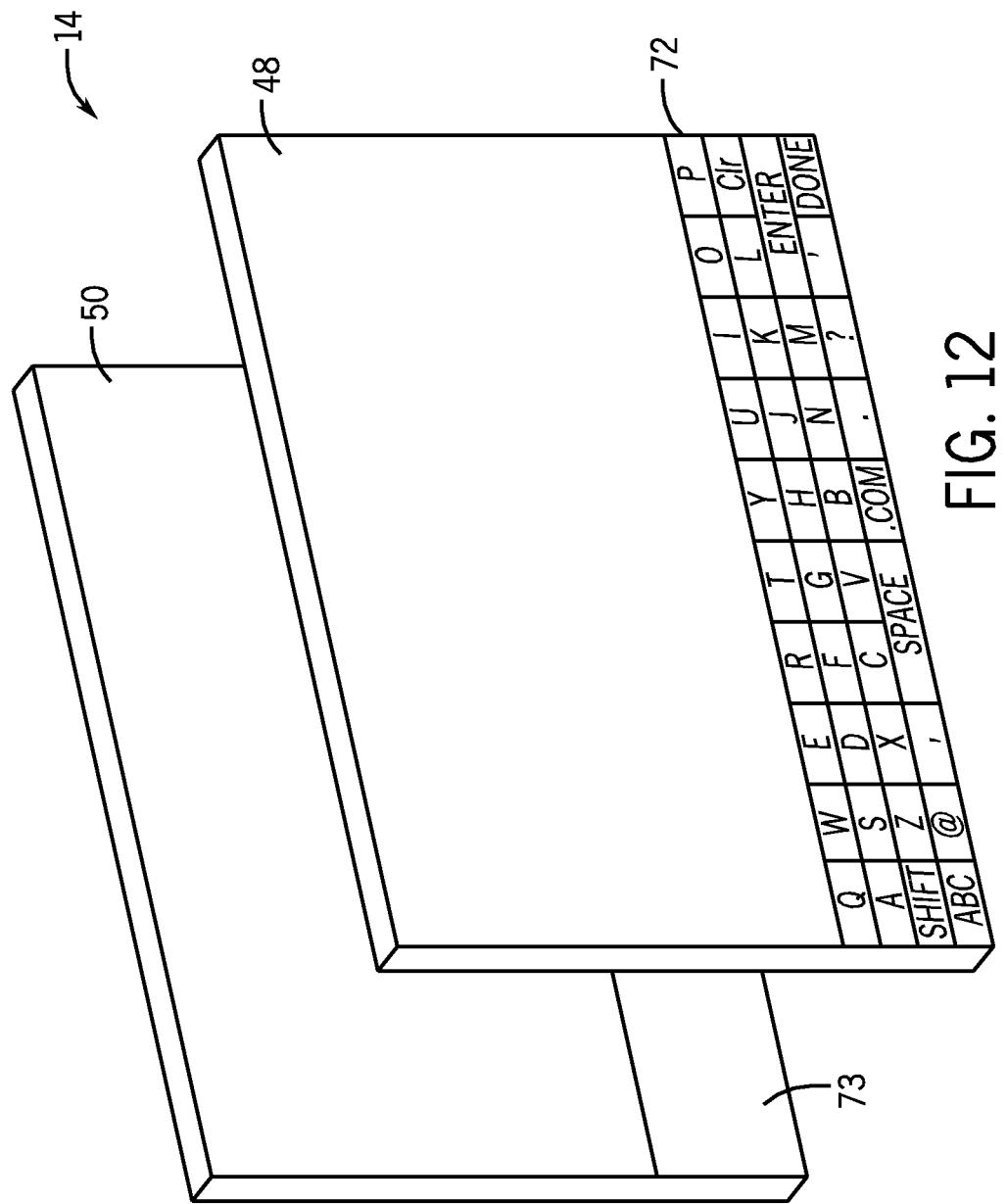
FIG. 12 is an eighth perspective view illustrating the display of the electronic device of FIG. 1, in accordance with one embodiment of the present invention.

In another embodiment, as illustrated in FIG. 12, display screen 48 may be a passive display screen while display screen 50 may be an active display screen. With a passive display screen, activation of an entire row or column of pixels may allow for generation of an image of a particular shape and/or color. However, fine adjustments to individual pixels may be difficult on a passive display screen. Accordingly, the display screen 48, as a passive display screen, may be utilized for generation of predetermined shapes such as keyboard 72, icons, and/or other predetermined images. In one embodiment, the display screen 48 may not be fully pixilated; rather, the display screen 48 may only include pixels for generating the predetermined shapes (e.g., the keyboard 72).

In contrast, with an active display screen, activation of any specific pixel independent from all other pixels in its corresponding row and column is controllable. Accordingly, fine adjustments to individual pixels may be made when utilizing an active display screen, such as display screen 50 of FIG. 12. Thus, display screen may be utilized for intricate image generation, such as generation of pictures, video images, or other fine resolution images. Also, display screen 50 may illuminate a region 73 to serve as a backlight for the keyboard 72 or other icons of the display screen 48. Determination of which display screen 48 or 50 an image may be transmitted to may be made by the electronic device according to the flow chart illustrated in FIG. 13.

Figure 13:
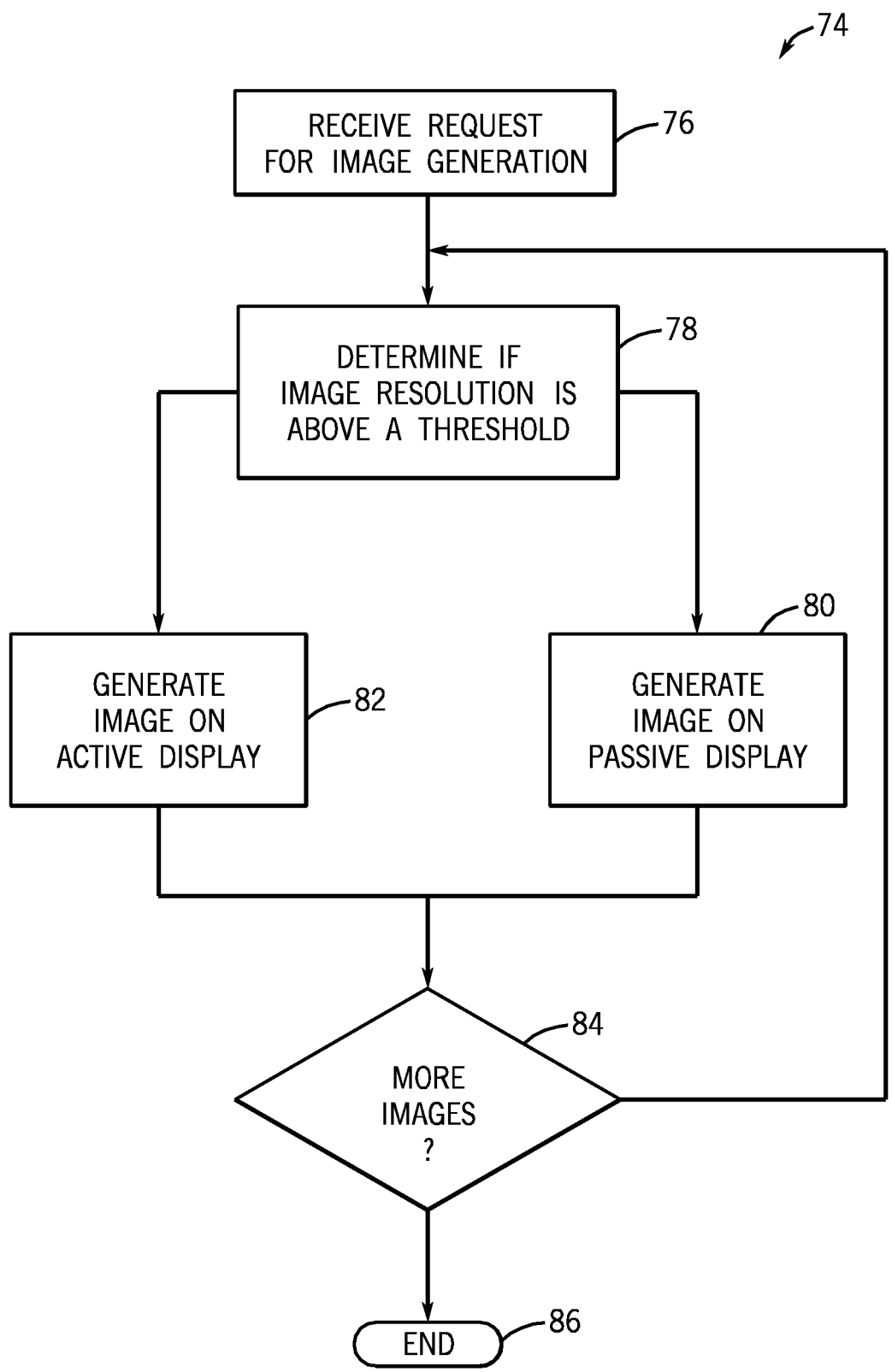
FIG. 13 is a second flow diagram illustrating the operation of the display of FIG. 1, in accordance with one embodiment of the present invention.

FIG. 13 illustrates a flow chart 74. In step 76, the processor(s) 24 may receive a request for an image to be generated on the display 14. This request may issue from, for example, a user interfacing with the device 10 via a touch screen. In step 78, the processor(s) 24 may determine if the resolution of the image to be generated on the display 14 is above a threshold. Based on this determination, the processor(s) 24 may operate to generate the image on one of either the display screen 48 as a passive display screen or the display screen 50 as an active display screen.

That is, if the resolution of the image to be generated is determined in step 78 to be below a threshold, the processor(s) 24 may transmit one or more signals to display screen 48 as the passive display screen in step 80. Alternatively, if the resolution of the image to be generated is determined in step 78 to be above a threshold, the processor(s) 24 may transmit one or more signals to display screen 50 as the active display screen in step 82. In this manner, the processor(s) 24 may operate to direct images to a display screen 48 or 50 that may be suited to the type of image to be displayed. It should be noted that the threshold may be initially programmed and stored in the memory 26 or storage 28. Additionally and/or alternatively, the threshold may be determined and/or modified by the user via, for example, user input.

Subsequent to both steps 80 and 82, the processor(s) 24 may determine whether more images are to be generated on the display in step 84. If more images are to be received, the processor(s) 24 may repeat the above beginning at step 78. If, however, no further requests for image generation are received by the processor(s) 24 in step 84, then process will terminate in step 86. Accordingly, the display 14 may be produced with one active display screen and one passive display screen, which may reduce costs of production of the device 10, without a decrease in image quality viewed by a user.

Figure 14:
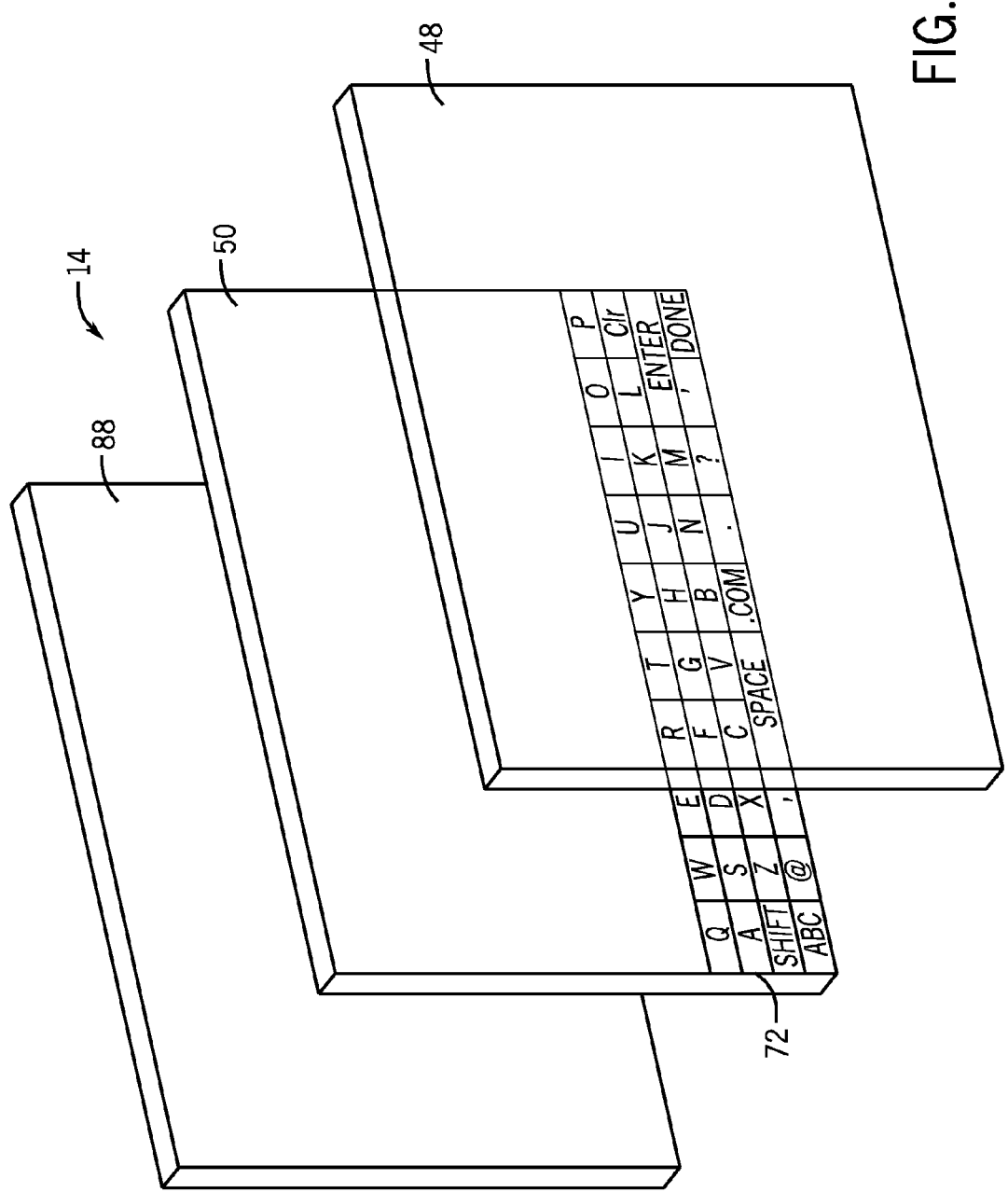
FIG. 14 is a ninth perspective view illustrating the display of the electronic device of FIG. 1, in accordance with one embodiment of the present invention.

Another embodiment of the display 14 is illustrated in FIG. 14. FIG. 14 illustrates the display 14 as including three display screens 48, 50, and 88. As illustrated, display screens 48 and 88 may be active display screens while display screen 50 may be a passive display screen. As such, the display 14, via the processor(s) 24, may operate such that display screens 48 and 50 are available for generating images when the electronic device 10 a forward facing position, while display screen 88 is either opaque or transparent. Furthermore, when, for example, an accelerometer of the electronic device detects that the device has been rotated 180 degrees such that display screen 48 is facing away from a user, the processor(s) 24 may operate such that display screens 88 and 50 are available for generating images, while display screen 48 is either opaque or transparent. In this manner, the device 10 may operate independent of the manner in which a user flips the device about its x-direction 42 or y-direction 44.

Figure 15:
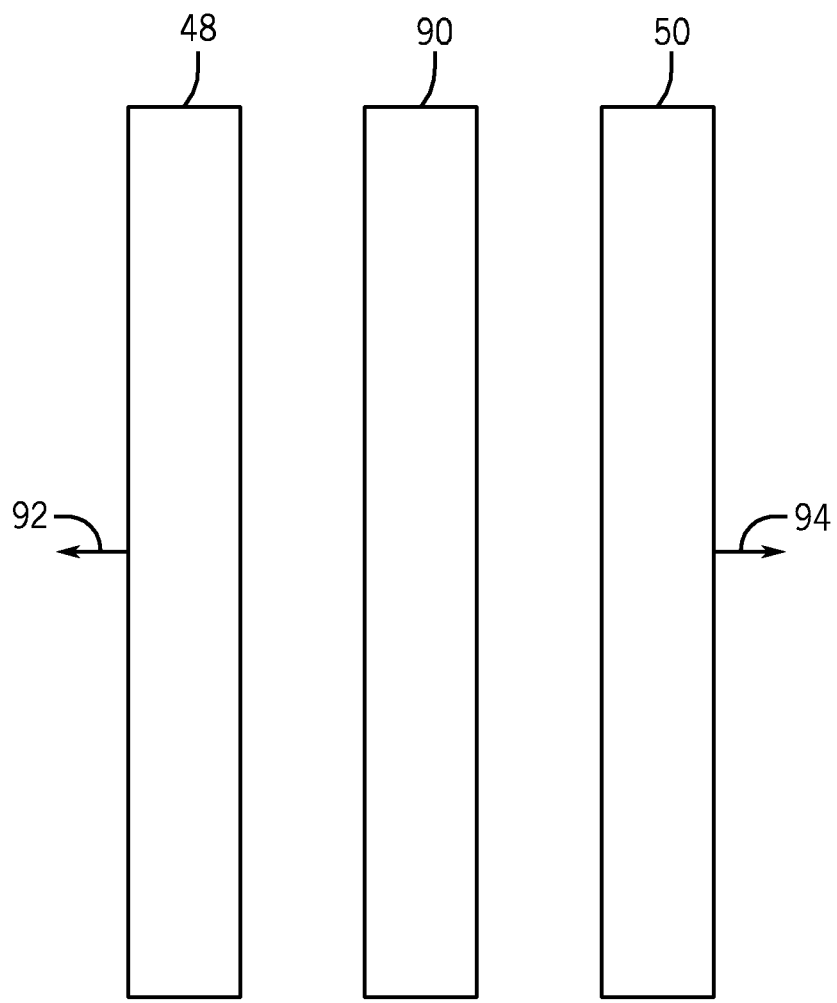
FIG. 15 is a tenth perspective view illustrating the display of the electronic device of FIG. 1, in accordance with one embodiment of the present invention.

FIG. 15 illustrates a back-to-back configuration of the display 14 that includes display screens 48 and 50 surrounding an opaque layer 90. The opaque layer 90 may be switchable glass (smart glass) that allows for the opaque layer to switch from opaque to transparent. Alternatively, the opaque layer 90 may include a one-way mirror such that a user may see through the opaque layer 90 while preventing images from being viewed on an opposite side from the user.

In one embodiment, the opaque layer 90 may prevent light from passing from display screen 48 to display screen 50. As such, an image 92 generated on display screen 48 may not be visible on display screen 50. Instead, the processor(s) 24 may reverse (i.e., invert) the image 92 on display screen 48 as image 94 for a secondary user. In another embodiment, the opaque layer 90 may be switched to transparent such that the image 92 may be viewed by a secondary user through display screen 50.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A portable electronic device, comprising:
   a housing;
   a display comprising first and second overlapping display screens disposed within the housing;
   a motion sensor; and
   a processor disposed within the housing, wherein the processor generates a movable transparent window on the second display screen, wherein external objects behind the electronic device are viewable through the movable transparent window and the first display screen, wherein the processor positions the movable transparent window on the second display screen based on motion sensor data.

2. The portable electronic device defined in claim 1, wherein the motion sensor data indicates an amount that the electronic device has been rotated.

3. The portable electronic device defined in claim 2, wherein the processor generates a new movable transparent window on the first display screen in response to the motion sensor data.

4. The portable electronic device defined in claim 1, wherein the motion sensor comprises a three-axis accelerometer.

5. The portable electronic device defined in claim 1, wherein the processor changes the position of the movable transparent window in response to the motion sensor data.

6. The portable electronic device defined in claim 1, wherein the processor changes a size of the movable transparent window based on the motion sensor data.

7. The portable electronic device defined in claim 1, wherein the movable transparent window is surrounded by an opaque portion of the second display screen.

8. The portable electronic device defined in claim 1, wherein in response to the motion sensor detecting that the device has been rotated the moveable transparent window is removed from the second display screen and generated on the first display screen.

9. The portable electronic device defined in claim 8, wherein when the processor generates the movable transparent window on the second display screen the second display screen is facing the external objects, and wherein the moveable transparent window is removed from the second display screen and generated on the first display screen when the motion sensor detects that the device has been rotated such that the first display screen is facing the external object.

10. An electronic device, comprising:
    a housing;
    a display comprising first and second overlapping display screens disposed within the housing, wherein at least one of the first and second display screens includes a touch sensor that receives touch input from a user; and
    a processor disposed within the housing, wherein the processor positions a movable transparent window on the second display screen in response to the touch input and wherein external objects behind the electronic device are viewable through the movable transparent window and the first display screen.

11. The electronic device defined in claim 10, wherein the processor generates a new movable transparent window on the first display screen in response to the touch input from the user.

12. The electronic device defined in claim 10, wherein the processor changes a position of the movable transparent window in response to the touch input from the user.

13. The electronic device defined in claim 10, wherein the processor changes a size of the movable transparent window in response to the touch input from the user.

14. The electronic device defined in claim 10, wherein the movable transparent window is surrounded by an opaque portion of the second display screen.

15. The electronic device defined in claim 14, wherein the first display screen displays images that overlap the opaque portion of the second display screen.

16. The electronic device defined in claim 10, wherein the first display screen comprises first and second opposing surfaces connected by an edge, and wherein a flexible circuit is positioned on the edge such that the processor is coupled to the first display screen through the flexible circuit.

17. The electronic device defined in claim 16, further comprising a power source and memory devices, wherein the power source and memory devices are coupled to the flexible circuit.

* * * * *